United States Patent [19]

Simpson

[11] Patent Number: 4,794,522
[45] Date of Patent: Dec. 27, 1988

[54] METHOD FOR DETECTING MODIFIED OBJECT CODE IN AN EMULATOR

[75] Inventor: Richard O. Simpson, Austin, Tex.

[73] Assignee: International Business Machines Corporation, Armonk, N.Y.

[21] Appl. No.: 782,323

[22] Filed: Sep. 30, 1985

[51] Int. Cl.$^4$ ............................................. G06F 9/00
[52] U.S. Cl. ............................................. 364/200
[58] Field of Search ... 364/200 MS File, 900 MS File, 364/300

[56] References Cited

U.S. PATENT DOCUMENTS

| | | | |
|---|---|---|---|
| 4,077,058 | 2/1978 | Appell et al. | 364/200 |
| 4,245,302 | 1/1981 | Amdahl | 364/200 |
| 4,253,145 | 2/1981 | Goldberg | 364/200 |
| 4,587,612 | 5/1986 | Fisk et al. | 364/200 |

Primary Examiner—Gareth D. Shaw
Assistant Examiner—Jonathan C. Fairbanks
Attorney, Agent, or Firm—Walter J. Madden, Jr.; Alan H. MacPherson; John L. Jackson

[57] ABSTRACT

A method of emulating the instructions of a target computer in the instructions of a host computer to operate the host computer in accordance with the target computer instructions, the target computer having the capability of modifying its own instructions and data during operation, includes the steps of storing the target instructions in a target memory segment, sequentially withdrawing the target instructions from the target memory segment and executing the target instructions in the host computer, constructing a template of the host instructions for each of the target instructions executed, storing each of the templates for reuse each time the corresponding target instruction is to be executed, limiting access to those target instructions in the target memory segment which have been stored in one of the templates to permit only read operations to be performed thereon, and detectng a target instruction which attempts a write operation on one of the target instructions which is in a stored template.

7 Claims, 1 Drawing Sheet

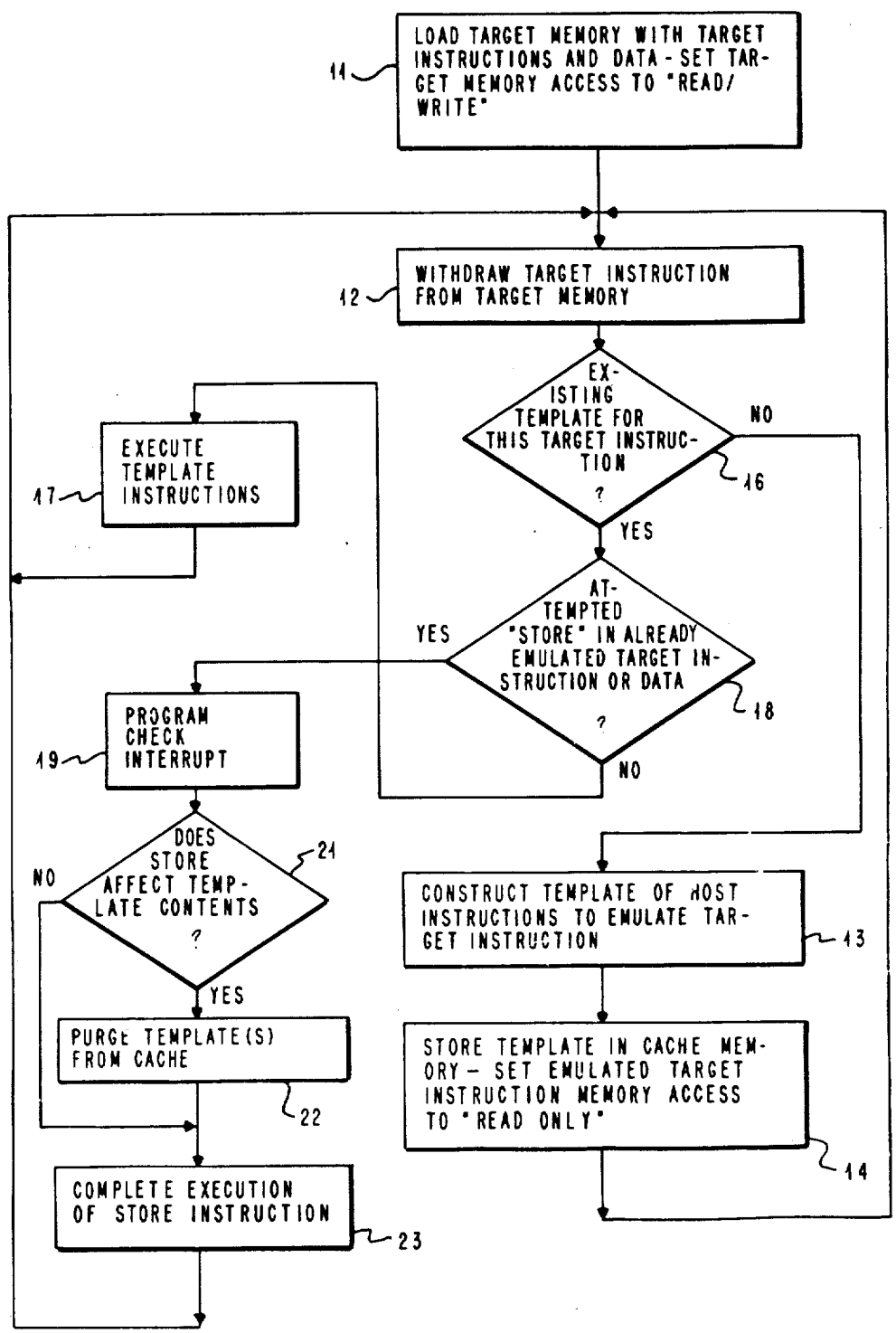

METHOD FOR DETECTING MODIFIED OBJECT CODE IN AN EMULATOR

CROSS-REFERENCES TO RELATED APPLICATIONS

Copending application Ser. No. 573,975, now U.S. Pat. No. 4,638,426, filed Dec. 30, 1982, Virtual Memory Address Translation Mechanism With Controlled Data Persistence now U.S. Pat. No. 4,638,426, issued Jan. 20, 1987, assigned to the same assignee as the present application, discloses a virtual address memory translation system employing special bits identified as "lock bits" to detect changes made to data structures in a database program. That application is incorporated herein by reference.

BACKGROUND OF THE INVENTION

1. Field of the Invention

This invention relates to the emulation of one computer by another computer, and relates more particularly to the detection of object code for the one computer which may be modified by the one computer during the process of such emulation.

2. Description of the Prior Art

In the description below, the following definitions are used:

Host computer: The actual hardware on which an emulator program runs.

Target computer: The computer which is being emulated.

It is well known that, in principle, any digital computer can be emulated on any other digital computer using only software techniques. However, software-only emulators are usually considered to be too slow to be of practical interest because they invariably require that many host instructions be executed to perform the function of just one target instruction.

Because of this, many approaches have been developed in which varying amounts of special-purpose hardware are used to assist the emulator program in performing its task. This hardware may be special registers which hold images of the most frequently used registers of the target computer, special host instructions which perform all or part of the function of certain target instructions, and so forth. There is always some cost associated with such hardware; in general, the faster the emulator is to be, the more elaborate and more expensive the hardware assist must be. Because of this hardware cost, a software-only emulator is very attractive, if only it can be made to run fast enough. The key to the speed of such a software-only emulator is the average number of host instructions which must be executed to perform an average target instruction.

The obvious approaches to the design of such emulators lead to programs which require many dozens or hundreds of host instructions per target instruction. In order for the performance of the emulator running on the host computer to be competitive with the actual target computer hardware, the host would have to be more than two orders of magnitude faster than the target computer. There is seldom such a wider peformance gap between hosts and targets of practical interest.

SUMMARY OF THE PRESENT INVENTION

In the present invention, an approach is taken which reduces to the order of ten or so the number of host instructions executed per target intruction. The method of operation of these emulators or simulators can be described as follows:

Using the current instruction address of the target computer, investigate the current target instruction.

Based on the op-code of the target instruction, select one of a set of instruction templates. Each template is a sequence of host instructions which performs the function of a specific target instruction op-code. Instructions in each template vary in number from about 5 to about 15.

Customize the template by building in references to the proper registers, addresses, etc. present in this specific instance of the target instruction.

Execute the customized template. This actually emulates the execution of the single target instruction.

Save the customized template for later re-use when the emulated target computer executes this instruction again. This is the key point from which the increased performance of the present invention derives.

The process of selecting and customizing a template to perform the work of one target instruction itself requires about 85 host instructions in a representative current emulator. Execution of the customized template requires about 10 host instructions. The high performance of the present invention comes from the fact that the customization operation is performed once, and then (on the average) the customized template is executed tens or hundreds of times during the course of the emulated target program.

The customized templates are kept in a "cache" in the host computer's memory in a manner very analogous to the operation of a hardware instruction cache on a high-performance computer. Management of this cache involves handling all the problems involved in a hardware cache. For example, as the emulator executes target instructions, a rapid determination must be made as to whether the target instruction (customized template) exists in the cache or whether the cache must be loaded (customization performed). When the cache is full, one or more entries must be purged to make room for more instructions (templates).

One problem which most hardware instruction cache systems must address is detection of changes to the instructions contained in the cache as the target program runs. The architecture of the IBM System/370 (and many other computer system architectures) allows such instruction modification, and specifies that the modified instructions must be executed as if no cache existed at all. It is this detection of modified cached instruction templates that is the subject of the present invention.

BRIEF DESCRIPTION OF THE DRAWING

The single drawing is a flow chart illustrating the operation of the method of the present invention.

DESCRIPTION OF THE PREFERRED EMBODIMENT

The host runs the emulator program using its own native instruction set, while the emulator program in turn runs (emulates the execution of) a target program which is expressed in the instruction set of the target computer. Although there is a technical distinction between a "simulator" and an "emulator", for the purpose of describing this invention, the distinction can be ignored. Techniques described here apply equally to both simulators and emulators.

The present invention makes use of the "lock bits" provided by the address translation hardware in the system described in the above referenced copending application. In the environment of that application, the lock bits are used in database programs to detect changes made to data structures and to cause these changes to be journalled to disk file journal storage. The lock bits provide a means for specifying storage protection on a granularity smaller than an entire page. The computer divides the 2048-byte pages of a "special segment" into sixteen lines of 128 bytes each, and a lock bit is associated with each line in a memory page, resulting in 16 lock bits per page. Each of these lines can be specified to have one of the following three protection states:

1. Read/Write, meaning that all accesses to the line by the program running on the host computer are permitted (both loads and stores).

2. Ready Only, meaning that only loads are permitted; an attempted store into the line will result in a program check interrupt.

3. No Access, meaning that neither loads nor stores are permitted; any access to the line will result in a program check interrupt.

The present invention uses only Read/Write and Read Only states; the No Access state is not employed in this invention.

The emulator program on the host computer maintains an image of the memory of the System/370 computer (the target) in a special segment of host virtual storage. The target memory segment contains both the target program (System/370 instructions) and the target data (data manipulated by the target program). These data and instructions are intermixed in target memory in whatever manner was specified by the author of the original target program.

System/370 architecture allows the target program to treat its own instructions as data and modify them at will. Such instruction modification is not performed very frequently; however, it must be allowed for if the emulator is to conform to the System/370 architecture, and the proper results must be supplied.

This invention takes advantage of the fact that modification of instructions is almost never done, by making it an exception condition which is detected by the host computer and address translation hardware and reported by way of a program check interrupt, while requiring no software checking logic in the main path of the emulator. This is done using lock bits as described below.

When the emulator program begins running a target program, it loads the target memory special segment with an image of the combined target program and target data as represented in block 11 of the flow chart. Using the lock bits as described in the above identified copending application, all the lines of the pages in the target memory are set to the "Read/Write" state, allowing the target program unrestricted access to its memory. The emulator starts processing target instructions by withdrawing them from the target memory, as shown in block 12, at the initial entry point of the target program.

As the emulator processes a target instruction, it customizes a template of host instructions as described above and represented by block 13. The templates are kept in an area of the host virtual storage separate from the target memory area. As a target instruction is processed and its customized template is placed in the cache, the 128-byte line of target storage which contains the target instruction is set to the "Read Only" state by a lock bit associated with that line (block 14).

The emulator proceeds with the execution of the target program, customizing new templates and adding them to the cache as new target instructions are reached, and re-executing existing customized templates from the cache as previously-processed target instructions are re-encountered (blocks 16 and 17). The customized templates need make no tests to determine whether the operations they perform on the target memory might modify the contents of a target instruction which has already been cached. As long as no host program check interrupt occurs, the contents of the cache are known to reflect accurately the contents of the target memory.

If the target program does modify a data item or instruction contained within one of the 128-byte lines for which cached templates exist, as represented in block 18, the host store instruction which does the modification will result in a program-check interrupt (block 19). When the cause of the interrupt is determined to be because of a lock bit violation (store into a Read Only line), an interrupt handling routine in the emulator is given control (block 21). The emulator can then do either of two things:

1. It can purge from the cache of customized templates all templates for instructions contained within the 128-byte line of target storage for which the program-check interrupt was generated (block 22). It then resets the state of the line to Read/Write and resumes execution of the interrupted program (block 23). The "store" operation which caused the interrupt will now succeed.

2. It can determine whether the word being stored actually contains a target instruction whose customized template has been cached. If so, only that template need be purged from the cache; if not, nothing need be purged. The emulator then temporarily sets the 128-byte line to the Read/Write state, completes the store operation, and sets the state back to Read/Only. The interrupted program is then resumed past the point of the store instruction which caused the interrupt.

Either approach will yield correct results. The first approach will result in fewer program-check interrupts due to stores into protected lines, at the expense of re-customization of templates whose target instructions were not actually modified. The second preserves more cached templates, but requires more time to modify data items contained in protected lines.

The present invention uses the lock bits of the type described to eliminate a considerable amount of overhead in a software-only emulator of System/370 or of any other computer architecture which allows instruction modification. Without assistance from the use of the lock bits as described, the cached templates for the target instructions would be required to check the address of each data item being modified in target memory to determine whether a target instruction at that address has been cached. Such checking logic can be quite expensive and would surely not be less than five or six host instructions. Since the average length of a customized template without such checking logic is only about ten instructions, eliminating the checking logic from the main path of the emulator is a very significant performance boost.

I claim:

1. A method of emulating the instructions of a target computer in the instructions of a host computer to operate said host computer in accordance with said target computer instructions, said target computer having the capability of modifying its own instructions and data during operation, said method comprising the steps of:

storing said target instructions in a target memory segment;

sequentially withdrawing said target instructions from said target memory segment and executing said target instructions in said host computer;

constructing a template of said host instructions for each of said target instructions executed;

storing each of said templates for reuse each time the corresponding target instruction is to be exectued;

limiting access to those target instructions in said target memory segment which have been stored in one of said templates to permit only read operations to be performed thereon; and detecting a target instruction which attempts a write operation on one of the target instructions which is in a stored template.

2. A method in accordance with claim 1 including the step of generating a program interrupt of said host computer in response to detection of a target instruction which attempts a write operation on a target instruction which is in one of said stored templates.

3. A method in accordance with claim 2 including the step of examining said target instruction which generated said interrupt to determine its effect on said target instruction in said stored template.

4. A method in accordance with claim 3 including the step of erasing said stored template after examining said target instruction and determining that said target instruction would modify said stored template.

5. A method in accorance with claim 4 including the step of executing said target instruction which generated said program interrupt to create a new template for storage.

6. A method in accordane with claim 3 including the step of executing said target instruction which generated said program interrupt if it is determined that execution of said target instruction will not affect the contents of said stored template.

7. A method in accordance with claim 1 including the steps of:

initially storing said target instructions in a target memory segment which permits both reading and writing of said target instructions.

* * * * *

UNITED STATES PATENT AND TRADEMARK OFFICE
CERTIFICATE OF CORRECTION

PATENT NO. : 4,794,522

DATED : December 27, 1988

INVENTOR(S) : Richard O. Simpson

It is certified that error appears in the above-identified patent and that said Letters Patent is hereby corrected as shown below:

Col. 1, line 62, "wider" should read --wide--.

Col. 3, line 19, "Ready Only" should read --Read Only--.

Signed and Sealed this

Twenty-sixth Day of December, 1989

Attest:

JEFFREY M. SAMUELS

*Attesting Officer*     *Acting Commissioner of Patents and Trademarks*